Dec. 23, 1958  J. KLEIN  2,865,271
WATERPROOF CAMERA DEVICE
Filed March 19, 1956  4 Sheets-Sheet 1

INVENTOR.
JORDAN KLEIN
BY
ATTORNEY

Dec. 23, 1958    J. KLEIN    2,865,271
WATERPROOF CAMERA DEVICE
Filed March 19, 1956    4 Sheets-Sheet 2

INVENTOR.
JORDAN KLEIN
BY
ATTORNEY

Dec. 23, 1958  J. KLEIN  2,865,271
WATERPROOF CAMERA DEVICE
Filed March 19, 1956  4 Sheets-Sheet 3

INVENTOR.
JORDAN KLEIN
BY
Zoltan Holoschtz
ATTORNEY

Dec. 23, 1958 J. KLEIN 2,865,271
WATERPROOF CAMERA DEVICE
Filed March 19, 1956 4 Sheets-Sheet 4
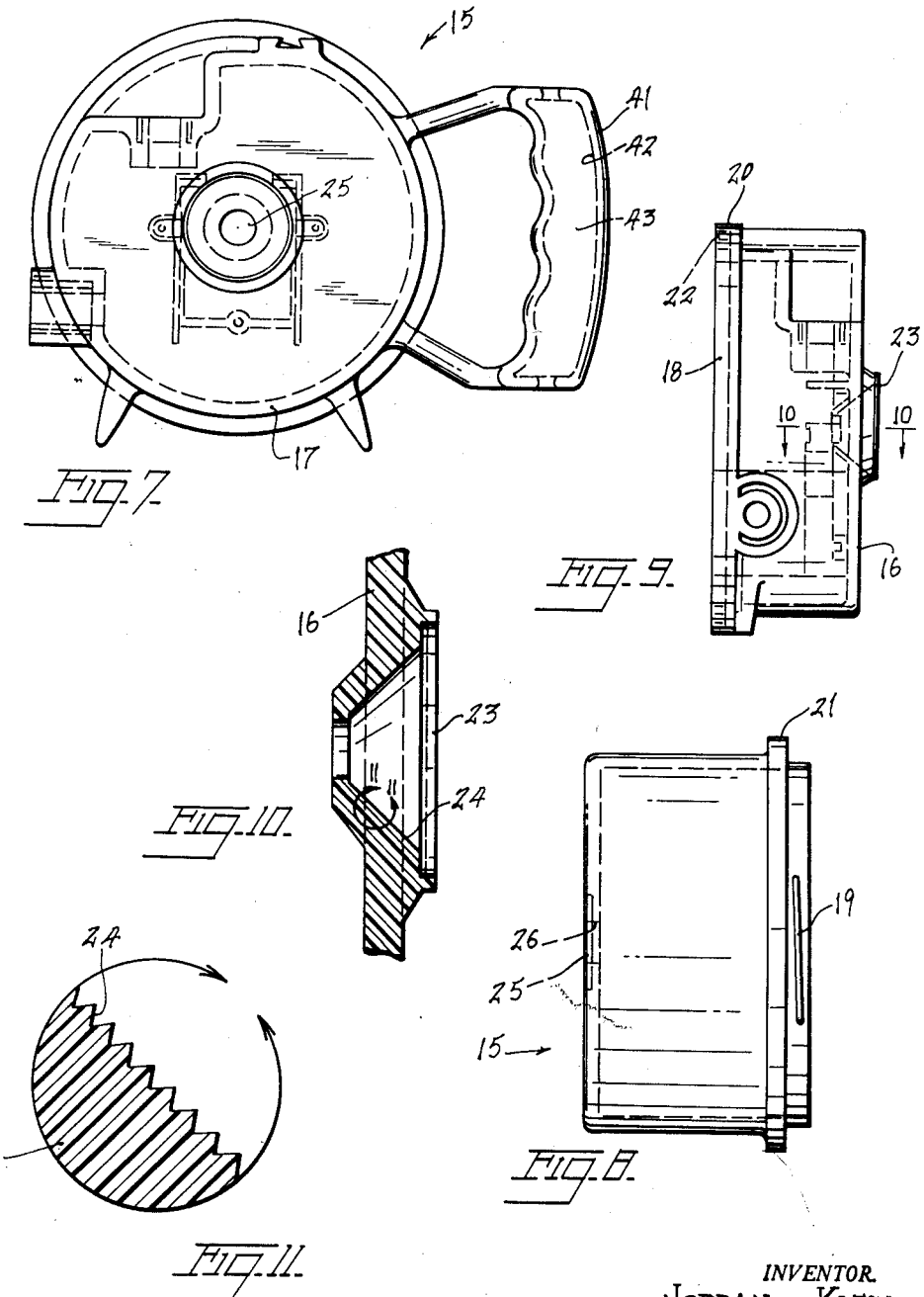
INVENTOR.
JORDAN KLEIN
BY
ATTORNEY United States Patent Office 2,865,271
Patented Dec. 23, 1958

2,865,271

WATERPROOF CAMERA DEVICE

Jordan Klein, Miami, Fla.

Application March 19, 1956, Serial No. 572,246

2 Claims. (Cl. 95—11)

This invention relates to new and useful improvements in underwater cameras.

More particularly, the present invention proposes the construction of an improved underwater camera which can be used by novice and expert alike easily and obviously without the need of any elaborate instructions to obtain pictures under water.

As a further object, the present invention proposes forming the camera with front and rear portions which screw or twist lock together with a watertight sealing ring between them securely held in place by the two sections.

Another object of the invention proposes constructing the casing with a shutter release and a film spool holder winding knob and knob shaft slidably and rotatably and watertightly mounted on the casing and extending into the casing.

Still another object of the invention proposes forming the casing with a transparent plastic lens cover and with a similar rear window cover and a ruby window member adjacent the rear window cover mounted in the casing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 7 is a rear view of the camera casing.

Fig. 8 is a side view of one section of the camera casing.

Fig. 9 is a side view of the other camera housing section.

Fig. 10 is an enlarged sectional view taken on line 10—10 of Fig. 9.

Fig. 11 is an enlarged sectional view of a part of the casing shown in Fig. 10, indicated by the arrows 11—11.

Figure 1:
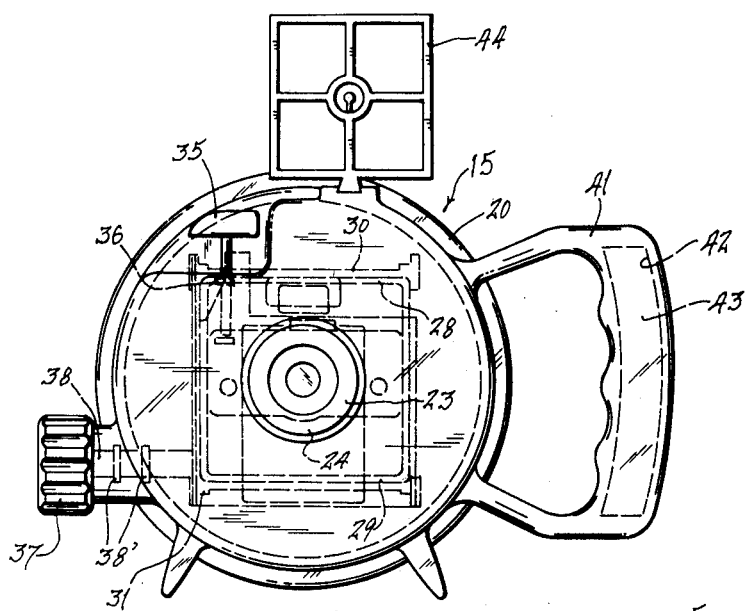
Fig. 1 is a front view of an underwater camera constructed and arranged in accordance with the present invention.
Figure 2:
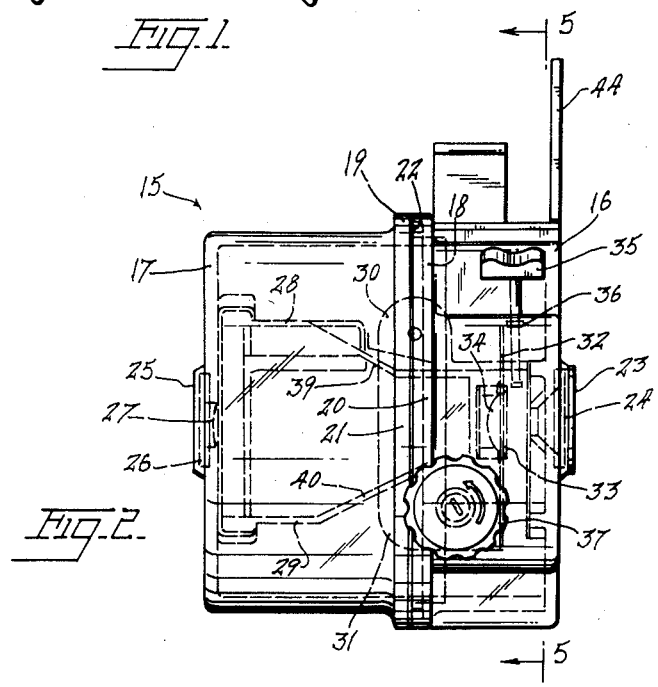
Fig. 2 is a side view of the structure shown in Fig. 1.
Figure 3:
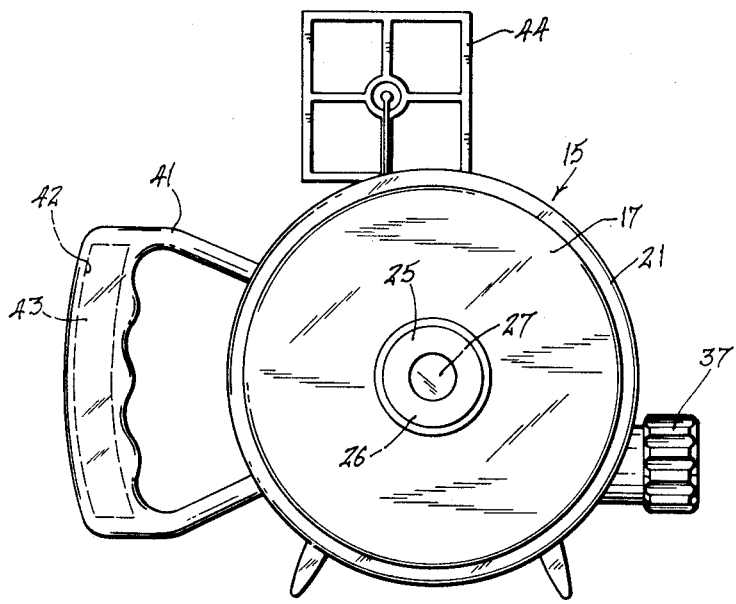
Fig. 3 is a rear view of the camera with no hidden parts indicated.
Figure 4:
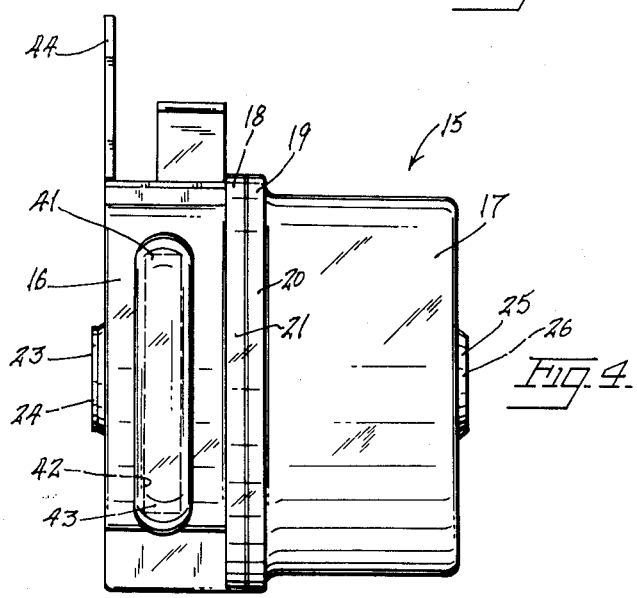
Fig. 4 is a side view similar to Fig. 3.
Figure 5:
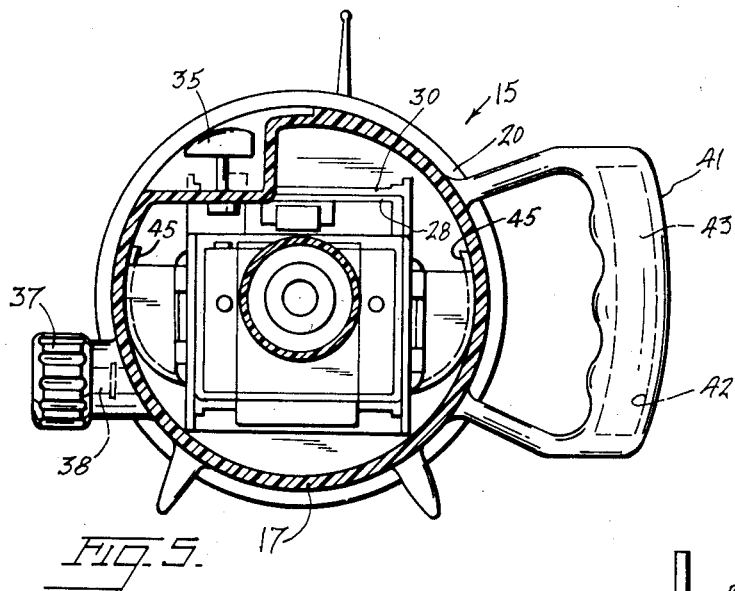
Fig. 5 is a sectional view taken on line 5—5 of Fig. 2.
Figure 6:
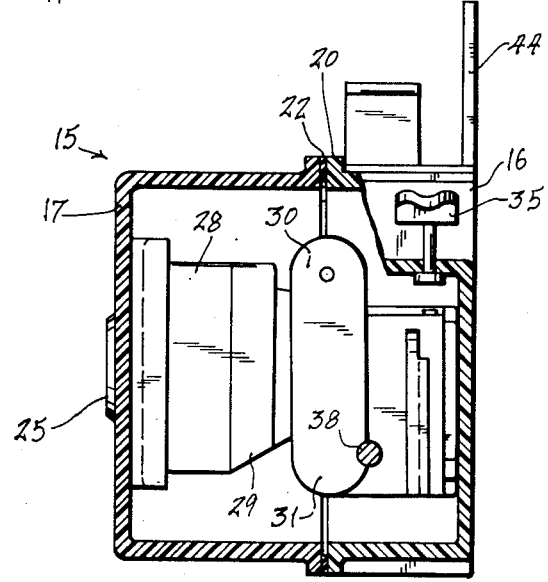
Fig. 6 is a view similar to Fig. 2 but with parts broken away and in section.

Referring more particularly to the drawings, the underwater camera of the present invention has a casing indicated generally by the reference numeral 15 and preferably made of heavy shock resistant thermoplastic material.

Casing 15 has a front portion 16 and a rear portion 17, both cylindrical in shade and having mating one-quarter turn threads 18 and 19 at their rear and front portions 20 and 21, respectively. An O sealing ring 22 fits between the front and rear portions 16 and 17 watertightly but removably to seal these portions together, the ring being held in place by the quarter turn threads holding the two portions 16 and 17 together.

A transparent plastic lens cover 23 is mounted on the front portion 16 of the casing over a lens opening 24 formed by a corrugated tapered bore in the flat front wall of portion 16 as best shown in Figs. 10 and 11. A transparent plastic rear window cover 25 is mounted over a rear window opening 26 in the flat rear wall of portion 17. A ruby window member 27 is mounted in the window opening 26 behind the transparent plastic rear window cover 25 in the rear portion 17 of casing 15.

Film guide members 28 and 29 are mounted in the rear portion 17 of the casing adjacent the ruby window member 27 and aligned with the lens opening 24 of the front portion 16 of the casing when the front and rear portions are screwed together.

A pair of spaced spool holders 30 and 31 are rotatably mounted in the casing adjacent the film guide members 28 and 29 and a shutter plate 32 and shutter mechanism 33 are mounted in the front portion 16 of the casing behind the transparent lens covers and lens opening. A lens 34 is mounted at the smaller end of the bore in the front wall of the casing behind the shutter plate, lens opening and lens cover. The bore is corrugated to prevent spurious, specular reflections from reaching lens 34.

Slidably mounted on the casing and connected with the shutter mechanism is a shutter release 35. An O sealing ring 36 holds the shutter release 35 watertight to the casing but slidably mounted on the casing for operating the shutter plate inside the casing from outside the casing.

A film winding knob 37 and knob shaft 38 is rotatably mounted on the casing, the shaft extending into the casing and being connected with one of the film spool holders for turning the holder from outside the casing. Spaced O sealing rings 38' hold the shaft 38 watertight to the casing but rotatable.

Two diverging walls 39 and 40 are mounted in the casing and extend substantially from the lens 34 towards the rear portion of the casing and between the film guide members.

A rigid handle 41 is attached to one side of the casing and extends outwardly therefrom. The handle has a corrugated finger grip portion offset from the casing for holding the casing with one hand. Handle 41 has a hollow portion 42 with a weight 43 inserted therein to make the handle a weighted handle.

Mounted on top of the casing adjacent the shutter release 35 is a view finder 44 for aiming or directing the camera for taking pictures under water.

The operation of the camera is simple and obvious. Film can be inserted by twisting open the two portions of the casing. The film passes over the film guide members and is moved by the film winding knob from outside the casing after the casing has been closed. The shutter is operated from outside the watertight casing by the shutter release 35.

Spring members 45 hold the camera components laterally in the casing and the frictional fit of the components in the casing when the casing halves are together hold the components from shifting lengthwise or longitudinally in the casing.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In an underwater camera, the combination comprising a pair of circularly cylindrical, hollow, plastic, opaque members separably joined by threaded means to form a waterproof joint, a circular sealing ring removably held between adjoining annular portions of said members, each of said members having a flat wall with an opening therein, a pair of transparent covers mounted on said walls respectively over the openings therein, one of said openings being formed by a generally conical corrugated bore tapering inwardly from the cover thereat, a lens mounted at the smaller end of the tapered bore, a pair of diverging walls extending substantially from said lens towards the other of said openings, a ruby window member mounted at the other of said openings, and a rigid handle secured to one of said members at the exterior thereof and having a corrugated finger grip portion offset from said one member.

2. An underwater camera, comprising a waterproof casing having front and rear cylindrical portions separably joined by threaded means, a circular sealing ring removably held between adjoining annular edges of said portions, a transparent plastic lens cover mounted on the front portion of the casing over an opening therein, said opening having a generally conical corrugated bore tapering inwardly from said lens cover, a transparent plastic rear window cover over another opening in the rear portion of the casing, a ruby window member mounted behind the rear window cover, film guide members mounted in the rear portion of the casing adjacent said ruby window member, a pair of spaced film spool holders rotatably mounted in the casing adjacent the film guide members, a shutter plate and shutter mechanism mounted in the front portion of the casing behind the lens cover, a lens mounted at the smaller end of the tapered bore in the front portion of the casing, a shutter release mounted on the casing and connected with the shutter mechanism inside the casing for operating the shutter plate, a film winding knob and knob shaft rotatably mounted on the casing and connected with one of the film spool holders for turning the holder from outside the casing, a pair of diverging walls extending substantially from said lens towards said other opening, and a rigid handle secured to the exterior of one of said portions, said handle having a corrugated finger grip portion offset from the casing.

References Cited in the file of this patent

UNITED STATES PATENTS

| 2,487,868 | Grigsby | Nov. 15, 1949 |
| 2,573,885 | Whitman et al. | Nov. 6, 1951 |

FOREIGN PATENTS

| 1,082,236 | France | June 16, 1954 |
| 179,967 | Austria | Oct. 25, 1954 |

OTHER REFERENCES

Gowland: "Underwater Camera," January 1954, "Photography," volume 34.

"Photo Technik und Wirtschaft," vol. 5, April 1, 1954.

Cross text "Underwater Photography and Television," 1954, Exposition Press.